March 11, 1969  MASAO SAKUMA  3,431,944
METERING VALVE

Filed Jan. 3, 1967  Sheet 1 of 2

INVENTOR
MASAO SAKUMA

United States Patent Office 3,431,944
Patented Mar. 11, 1969

3,431,944
METERING VALVE
Masao Sakuma, Kawasaki-shi, Japan, assignor to Kabushiki Kaisha Keihin Seiki Seisakusho, Kawasaki-shi, Kanagawa-ken, Japan, a corporation of Japan
Filed Jan. 3, 1967, Ser. No. 606,924
Claims priority, application Japan, Aug. 6, 1966 (utility model), 41/74,682
U.S. Cl. 138—45    2 Claims
Int. Cl. F16k 21/02; F15d 1/10

ABSTRACT OF THE DISCLOSURE

A metering valve comprising a hollow, slidable and spring-loaded piston and a needle positioned downstream of said piston, said piston and said needle establishing therebetween a variable throttle opening when said piston is subjected to fluctuating fluid inlet pressures.

---

This invention relates generally to flow control devices for controlling the flow of fluid through a pipe line which varies greatly in pressure.

Various and considerable efforts have been directed to realize efficient and sensitive metering valves, capable of controlling the outlet or delivery flow rate of the fluid under control regardless of fluctuation of the inlet pressure thereof.

According to the conventional technique, however, considerable deviation must be encountered for attaining and maintaining the desired constant flow rate in known metertering valves. The main reason for this deficiency may be counted for non-straight lined flow passage through the metering valve which, not only reduces the flow efficiency of the valve, but also delicately influences upon the control performance thereof to a substantial degree. In fact, various metering valves known prior to this application, such as those disclosed in U.S. Patent No. 2,460,647; No. 2,508,793; No. 2,554,790; No. 2,607,369; and No. 2,762,397, represent generally intricate valve flow passages.

The main object of the present invention is therefore to provide a metering valve, capable of providing a substantially constant flow rate at the outlet thereof, regardless of possible fluctuation of the inlet pressure, with a highly improved efficiency, under a considerably stabilized operating condition and with simpler design of the valve.

The foregoing and further objects, features and advantages of the invention will become more clear as the description proceeds by reference to the accompanying drawings illustrative substantially of a preferred embodiment of the invention, by way of example, and thus in no limiting sense thereof.

Figure 1:
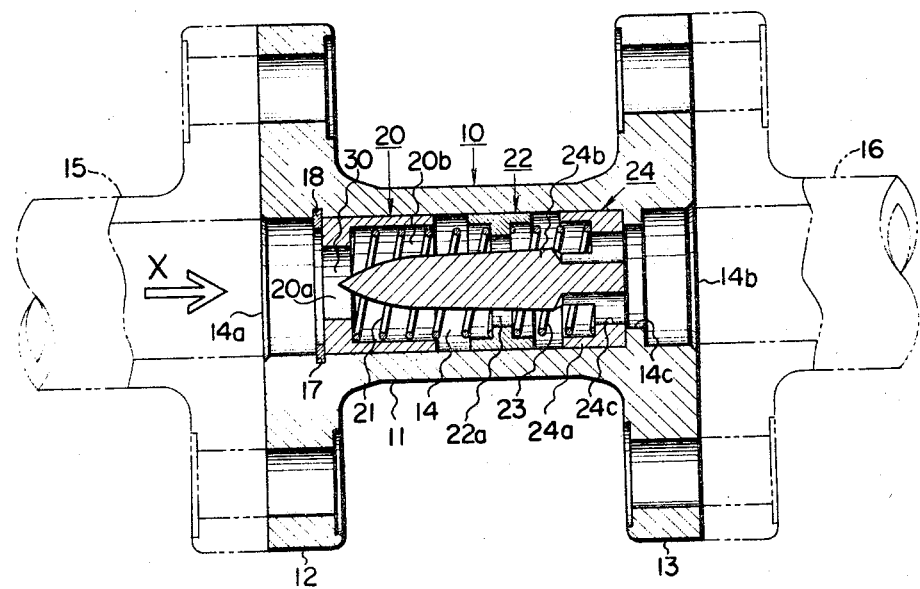
FIG. 1 is a longitudinal section of a preferred embodiment of the metering valve embodying the principles of the invention.

Now referring to the accompanying drawings, especially FIGS. 1 and 2 thereof, a preferred embodiment of the present invention will be described in detail hereinbelow:

In the drawing, 10 denotes a valve housing, preferably made of cast iron or steel and comprising a substantially cylindrical hollow main body 11 and fixing flanges 12 and 13, said housing being inserted in a pipe line for conveying any kind of fluid such as water or the like. In FIG. 1, the direction of the fluid flow is shown by an arrow X. Valve housing 10 is formed concentrically with an axial flow passage 14 bored therethrough and having inlet 14a and outlet 14b. Leading part and trailing part of the pipe line kept in fluid communication with said inlet 14a and outlet 14b, respectively, is represented by chain-dotted line 15 and 16 in schematic manner.

In the wall of flow passage 14, there is a peripheral groove 17 in proximity of the inlet 14a, which groove receives a spring clip 18 serving as stopper means for a hollow piston 20 slidably mounted in the flow passage 14.

The bore of the hollow piston 20 is stepped and comprises a reduced inlet opening 20a and a main bore 20b housing a coil spring 21. When the piston 20 is in its rest position shown in FIG. 1, it is urged resiliently against the spring clip 18 under the action of the spring 21.

A hollow slide 22 is formed with an inward peripheral projection 22a and mounted slidably in the flow passage 14 at an intermediate point between the inlet and the outlet of said passage, said spring 21 abutting resiliently against the peripheral projection 22a.

Needle means, generally denoted 24, comprises a perforated round disk 24a and a substantially bullet-shaped needle 24b, said disk being formed with a plurality of, herein shown four by way of example, perforations 24c. Between the slide 22 and the disk 24a of the needle means, there is inserted a coil spring 23 which abuts resiliently against these elements 22 and 24a, thereby said disk being kept in pressure engagement with an inward circular projection at 14c which is formed on the inside periphery of the casing body and in proximity of the outlet 14b.

The pointed upstream end of needle 24b situated normally within the range of the reduced inlet opening 20a of piston 20, thus a ring-shaped throttle zone 30 being established concentrically about the general longitudinal axis of the flow passage 14 of the valve. Under occasional cases, the needle end may be positioned at a slightly downstream position from said reduced inlet opening 20a.

Figure 3:
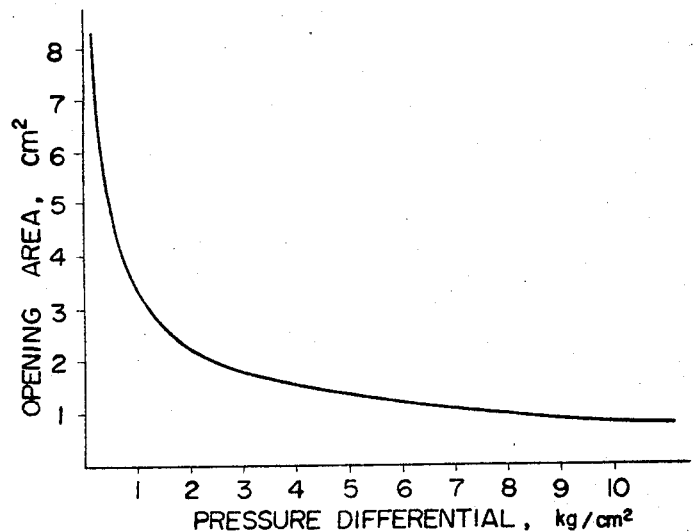
FIG. 3 is a diagram wherein the opening area at the throttle zone of a metering valve embodying the principles of the invention has been plotted against occasional and various pressure differences appearing between the inlet and the outlet of the valve.
Figure 4:
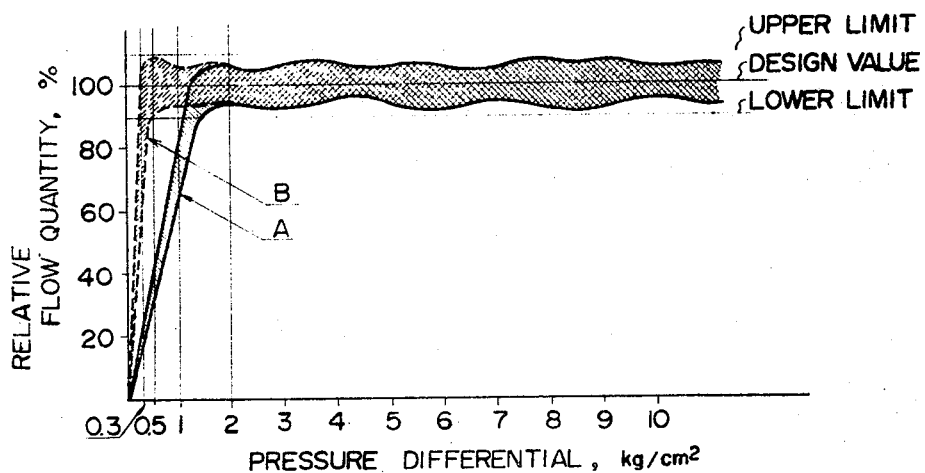
FIG. 4 is a diagram illustrating the flow rate as expressed in percentage of the designed constant flow rate and plotted against occasional and various pressure differences appearing between the inlet and the outlet of a metering valve embodying the principles of the invention.

When a fluid pressure, for instance, ranging from 0.5 to 10 kg./cm.$^2$, see FIG. 4, is applied from the upstream piping 15 to the inlet 14a of the present metering valve so far shown and described, the fluid acts upon the upstream extremity of the slidable hollow piston 20 which is thereby urged to move in the downstream direction a certain distance against the combined urging force exerted by the two springs 21 and 23. The occasionally determined distance as determined by the difference between the inlet pressure at 14a and the outlet pressure at 14b will naturally govern the degree of the opening area at the throttle zone 30, as will be clearly seen from FIG. 3, shown by way of example. In this case, the hollow slide 22 will be also urged to move in the downstream direction, say half the said distance, when the springs 21 and 23 are of same strength.

After passage through the thus determined passage area at 30, the fluid flows through the main flow passage formed around the bullet-shaped needle 24b and within the main body 11 of the valve. Then, it will flow through the divided branch passages formed by the perforations 24c and is assembled again together at a somewhat reduced passage defined by the circular projection 14c; thence through the outlet 14b into the downstream piping 16.

Figure 2:
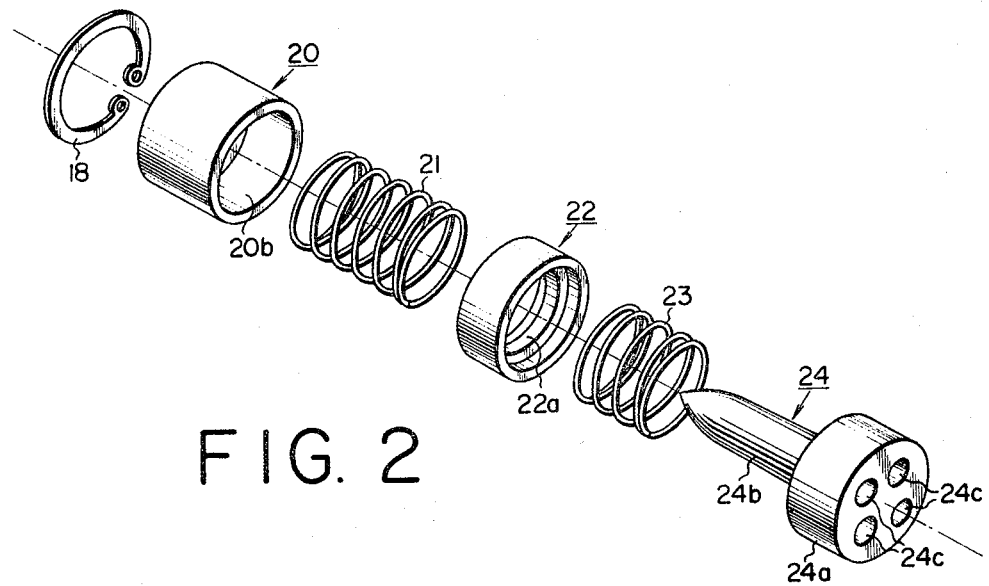
FIG. 2 is an exploded perspective view of the inner constituent parts of the valve shown in FIG. 1.

As seen from FIG. 1, the flow passage through the metering valve according to this invention is substantially straight and considerably stream-lined, which fact contributes amazingly to attaining the desired metering effect, as ascertained from reference to FIG. 4.

Although not shown, the intermediate slide 22 and the second coil spring 23 can be dispensed with under certain conditions, when a stronger and more elongated coil spring is replaced with the first spring 21. The performance curve denoted by full lines in FIG. 4 corresponds to that obtainable with this simplified and modified embodiment, while the first embodiment shown in FIGS. 1 and 2 represents a performance curve shown by dotted lines in the same figure. Therefore, with use of the simplified metering valve, a more remarkable reduction in the flow rate will be encountered at lower inlet fluid pressures. This effect is attributable to the fact that the pressure differential of lower value invites in this case a more considerable change in the opening area at the throttle zone.

Next, the operation of the metering valve according to this invention will be mathematically set forth.

In order to obtain the desired effect for realizing a predetermined constant flow rate regardless of possible fluctuation in the inlet fluid pressure, it is only necessary to control automatically the passage opening at the throttle zone, depending upon the occasional differential between the inlet and outlet fluid pressures. Since the throttle zone constitutes a kind of orifice, the following formula will be established:

$$Q = C_1 A_1 \sqrt{2gh_1}$$
$$= C_2 A_2 \sqrt{2gh_2}$$

where, $Q$ = flow rate of the fluid under treatment cm.$^3$/sec.
$A_1$; $A_2$ = opening areas, cm.$^2$, of the orifice under first and second operating conditions
$h_1$; $h_2$ = pressure differentials, cm., under first and second operating conditions.
$C_1$; $C_2$ = non-dimensional constants under first and second operating conditions.
$g$ = gravity constant, 980 cm./sec./sec.

Then, $$A_2 = A_1 \frac{C_1 \sqrt{2gh_1}}{C_2 \sqrt{2gh_2}} \quad (1)$$

When considering the values $C_1$; $C_2$; $A_1$; $h_1$ to be specific constants for the initial conditions, and representing them as a whole by a single constant $C$, the formula 1 will become:

$$A_2 = \frac{C}{\sqrt{h_2}} \quad (2)$$

When this relation is plotted on a chart, a similar curve as shown in FIG. 3 may be found.

When observing the curve shown in FIG. 3, it can be seen that the necessary variation in the opening area for lower pressure differential is considerably predominant relative to that required for higher pressure differential. In the first embodiment shown in FIGS. 1 and 2, one of the both springs, preferably the second spring 23, is selected to be considerably weaker than the other, preferably the first spring 21, so as to meet the aforementioned operating conditions with lower pressure differentials. Only after the second weaker spring has been considerably deflected, the first spring will respond to higher pressure differentials, so as to meet the aforementioned operating requirements, although in the foregoing the strengths of these both springs have been assumed, only for simplicity of description, to be equal to each other. This critical point is that when the intermediate slide 22 has been brought into engagement with the disk 24a.

Even when using the simplified modification employing a single spring, however, the requirement can be substantially met as shown the dotted line performance curve in FIG. 4.

While the invention has been shown and described as embodied substantially in an embodiment, it is not intended to limit the present invention to the details shown, since various modifications and structural changes may be made without departing from the spirit of the invention.

Without further detail description, the foregoing will so fully reveal the gist of the present invention that those skilled in the art can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. A metering valve for fluid flow control, comprising a valve casing having a straight longitudinal fluid flow passage formed therein and defined by inlet and outlet ends, a slidable valve member mounted within said flow passage and movable from a predetermined initial position upstream to a downstream position upon being subjected to a pressure differential appearing between said inlet and outlet ends, and spring means urging said valve member towards its initial position, said valve member comprising a movable hollow piston and a stationary needle means, said piston being positioned slidably in proximity to said inlet end, said needle means includes a needle proper arranged along the longitudinal axis of said flow passage and a perforated disk rigidly attached to the downstream end of said needle proper at a position downstream in said flow passage relative to said piston, said piston moving longitudinally along said needle proper establishing a variable throttle zone therebetween.

2. A metering valve as set forth in claim 1, including an intermediate hollow slide mounted between said piston and said disk, said spring means comprising two spring elements, one of said spring elements, being inserted between said piston and said intermediate slide and the other of said spring elements being inserted between said slide and said disk, one of the spring elements being selected to be considerably weaker than the other spring element.

References Cited
UNITED STATES PATENTS

| | | | |
|---|---|---|---|
| 2,426,238 | 8/1947 | Platon | 138—43 |
| 2,607,369 | 8/1952 | Miller | 138—43 |
| 2,647,017 | 7/1953 | Coulliette | 239—583 X |
| 2,995,148 | 8/1961 | Novak et al. | 137—541 X |

HERBERT F. ROSS, *Primary Examiner.*

U.S. Cl. X.R.

138—43; 239—583; 137—541